United States Patent
Takahashi et al.

(10) Patent No.: US 12,439,930 B2
(45) Date of Patent: Oct. 14, 2025

(54) SCRAPER APPARATUS

(71) Applicant: MAYEKAWA MFG. CO., LTD., Tokyo (JP)

(72) Inventors: Noriyuki Takahashi, Tokyo (JP); Koji Takanashi, Tokyo (JP); Sayaka Iwaki, Tokyo (JP)

(73) Assignee: MAYEKAWA MFG. CO., LTD., Tokyo (JP)

(*) Notice: Subject to any disclaimer, the term of this patent is extended or adjusted under 35 U.S.C. 154(b) by 0 days.

(21) Appl. No.: 18/697,062

(22) PCT Filed: Jul. 20, 2023

(86) PCT No.: PCT/JP2023/026504
§ 371 (c)(1),
(2) Date: Mar. 29, 2024

(87) PCT Pub. No.: WO2024/029345
PCT Pub. Date: Feb. 8, 2024

(65) Prior Publication Data
US 2024/0397959 A1    Dec. 5, 2024

(30) Foreign Application Priority Data

Aug. 3, 2022  (JP) ................... 2022-124091

(51) Int. Cl.
*A22C 21/00* (2006.01)
(52) U.S. Cl.
CPC ................ *A22C 21/0069* (2013.01)
(58) Field of Classification Search
CPC .............. A22C 21/003; A22C 21/0023; A22C 21/0069

(Continued)

(56) References Cited

U.S. PATENT DOCUMENTS

| 9,706,782 B2 | 7/2017 | Inoue et al. |
| 2009/0170417 A1 | 7/2009 | Janssen et al. |
| 2010/0120344 A1* | 5/2010 | Van Den Nieuwelaar ................. A22C 21/0069 452/136 |

FOREIGN PATENT DOCUMENTS

| EP | 1956919 B1 | 10/2015 |
| EP | 2134184 B2 | 5/2021 |

(Continued)

OTHER PUBLICATIONS

International Search Report issued in Intl. Appln. No. PCT/JP2023/026504, mailed Aug. 22, 2023. English translation provided.

(Continued)

*Primary Examiner* — Richard T Price, Jr.
(74) *Attorney, Agent, or Firm* — ROSSI, KIMMS & McDOWELL LLP

(57) ABSTRACT

A scraper apparatus according to at least one embodiment of the present disclosure includes a pair of scrapers disposed opposite each other in a perpendicular direction to a conveying direction of a poultry carcass held by a holder and configured to remove meat attached to a processed portion of the poultry carcass by putting the processed portion between the pair of scrapers. The scraper apparatus according to at least one embodiment of the present disclosure includes a support part which supports the pair of scrapers so as to allow displacement of the pair of scrapers in the perpendicular direction to follow the shape of the processed portion of the poultry carcass moving in the conveying direction.

10 Claims, 9 Drawing Sheets

(58) Field of Classification Search
USPC .................................................. 452/135, 136
See application file for complete search history.

(56) References Cited

FOREIGN PATENT DOCUMENTS

| | | | |
|---|---|---|---|
| JP | 2009518034 | A | 5/2009 |
| JP | 2010522556 | A | 7/2010 |
| JP | 2013017452 | A | 1/2013 |
| JP | 6216056 | B2 | 10/2017 |

OTHER PUBLICATIONS

Written Opinion issued in Intl. Appln. No. PCT/JP2023/026504, mailed Aug. 22, 2023.
Extended European search report issued in European Appln. No. 23849900.8 mailed on Jan. 17, 2025.
International Preliminary Report on Patentability issued in Intl. Appln. No. PCT/JP2023/026504, mailed Feb. 13, 2025. English translation provided.
English translation of Written Opinion issued in Intl. Appln. No. PCT/JP2023/026504, mailed Aug. 22, 2023, previously cited in an IDS on Mar. 29, 2024.

* cited by examiner

A-A

SCRAPER APPARATUS

TECHNICAL FIELD

The present disclosure relates to a scraper apparatus for cut-up processing of poultry carcasses of fowls such as chickens.

BACKGROUND

Generally, in the cut-up processing of cutting up poultry carcasses of fowls such as chickens and separating meat and bone, the carcasses are plucked and bled, and pre-processed by removing guts and other organs (evisceration), followed by cutting and deboning. Since the cutting and deboning process is inefficient when performed manually, automation is being promoted (see, for example, Patent Document 1).

Also, an apparatus for separating poultry breast cartilage, commonly known as "yagen", from the upper half of a poultry carcass after separating breast meat with wings and poultry tenderloins is known (see, for example, Patent Document 2). The breast cartilage is eaten as grilled chicken or used as a raw material for glucosamine, which is said to be beneficial for osteoarthritis and rheumatism.

CITATION LIST

Patent Literature

Patent Document 1: JP6216056B
Patent Document 2: JP2013-017452A

SUMMARY

Problems to be Solved

For example, a small amount of the poultry tenderloin meat remains on breast cartilage of a poultry carcass after breast meat with wings and poultry tenderloins are separated. Conventionally, the remaining meat on the breast cartilage is removed manually. Therefore, there is a need to automate the removal of meat from processed portions of poultry carcasses, such as the removal of meat remaining on the breast cartilage.

In view of the above, an object of at least one embodiment of the present disclosure is to automate the removal of meat attached to a processed portion of a poultry carcass.

Solution to the Problems (1) A scraper apparatus according to at least one embodiment of the present disclosure includes: a pair of scrapers disposed opposite each other in a direction perpendicular to a conveying direction of a poultry carcass held by a holder and configured to remove meat attached to a processed portion of the poultry carcass by putting the processed portion between the pair of scrapers; and a support part which supports the pair of scrapers so as to allow displacement of the pair of scrapers in the perpendicular direction to follow the shape of the processed portion of the poultry carcass moving in the conveying direction.

Advantageous Effects

According to at least one embodiment of the present disclosure, it is possible to automate the removal of meat attached to a processed portion of a poultry carcass.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Conveyance Device 1)

First, a conveyance device for conveying poultry carcasses will be described prior to describing a scraper apparatus according to an embodiment.

Figure 1:
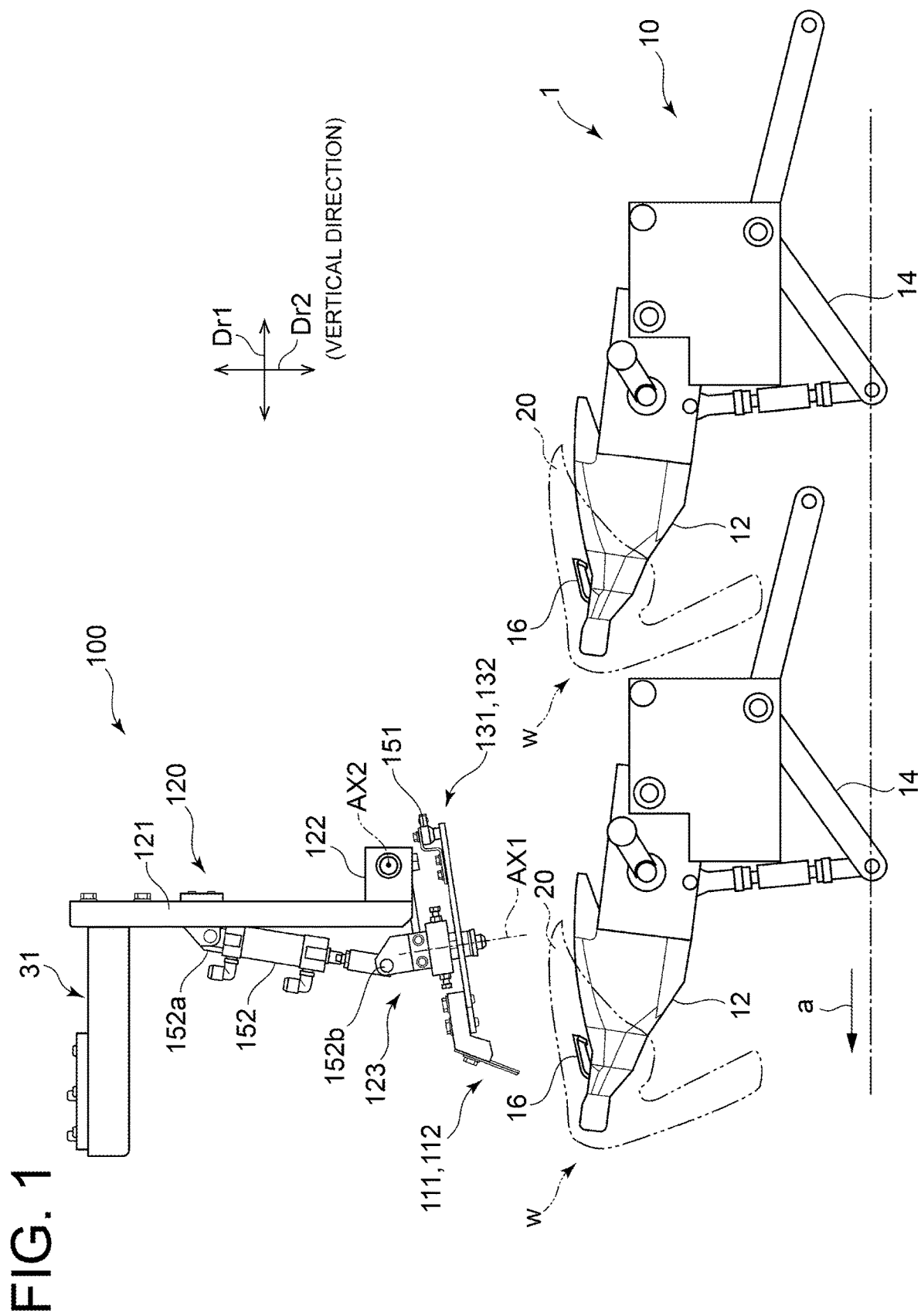
FIG. 1 is a side view of a scraper apparatus and a conveyance device when the scraper apparatus is in the retracted position away from a cone.

FIG. 1 is a side view of a scraper apparatus 100 and a conveyance device 1 when the scraper apparatus 100 is in the retracted position away from a cone 12.

Figure 2:
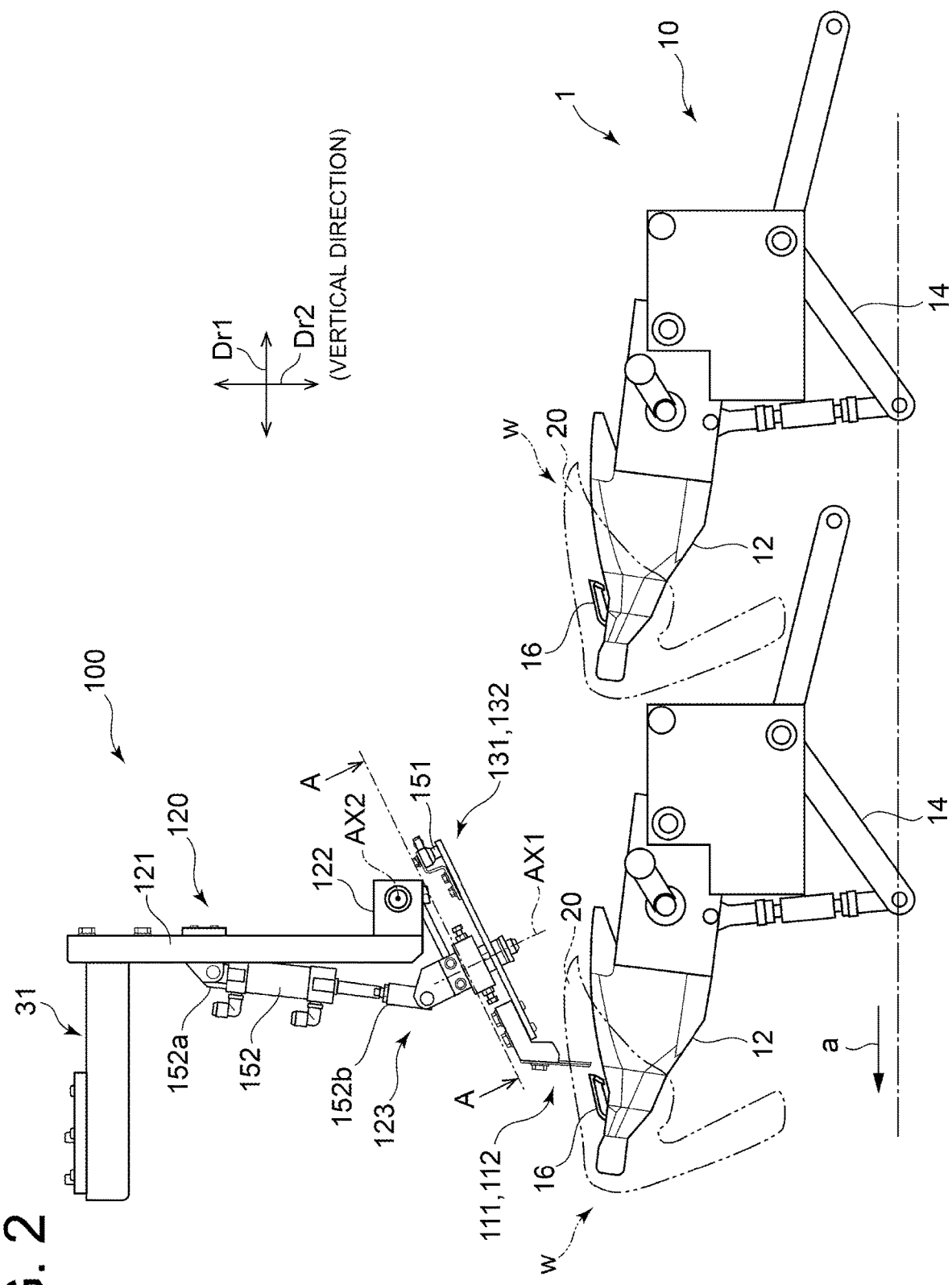
FIG. 2 is a side view of the scraper apparatus and the conveyance device when the scraper apparatus is in the removal position for removing the remaining meat.

FIG. 2 is a side view of the scraper apparatus 100 and the conveyance device 1 when the scraper apparatus 100 is in the removal position for removing the remaining meat.

The conveyance device 1 has a chain conveyor 10 which moves at a constant speed in the direction of arrow a. The chain conveyor 10 has a plurality of cones 12 (holders) of conical shape mounted at equal intervals along the conveying direction. The cone 12 can be tilted by a link mechanism 14 at any angle forward or backward in the conveying direction. On the cone 12 at the beginning (not shown) of the chain conveyor 10, an eviscerated poultry carcass with legs separated is placed.

The cone 12 has a hook 16 that is movable between the cone tip and the cone base by a link mechanism (not shown). After the poultry carcass is placed on the cone 12, the hook 16 engages the center of the breast bone of the poultry carcass to secure the poultry carcass to the cone 12. The poultry carcass placed and secured on each of the plurality of cones 12 is conveyed, and during conveyance, the carcass is cut up and deboned in multiple processing sections that are arranged to face the chain conveyor 10 in sequence in the conveying direction. The poultry carcass secured to the cone 12 is first processed to separate the breast meat with wings from the poultry carcass. As a result of the process of separating the breast meat with wings, the poultry carcass bone, called "gara", from which the breast meat with wings has been separated remains on the cone 12.

After the process of separating the breast meat with wings, the poultry carcass gara is subjected to the poultry tenderloin lateral incision process, in which incisions are made between poultry tenderloins and ribs to separate the poultry tenderloins from the ribs.

Once the poultry tenderloins and ribs are separated, the yagen insertion process is performed to separate a breast cartilage portion 20 from the poultry tenderloins. Then, the poultry tenderloin vertical incision process is performed to separate the clavicles from the poultry tenderloins. Once the clavicles and tenderloins are separated, the poultry tenderloin collecting process is performed to collect the poultry tenderloins from the poultry carcass gara. As a result of the poultry tenderloin collecting process, the poultry carcass gara (hereinafter, "workpiece w") from which the breast meat with wings and the poultry tenderloins have been separated remains on the cone 12.

After the poultry tenderloin collecting process, the workpiece w is subjected to the yagen remaining meat removal process. In the yagen remaining meat removal process, meat remaining on both sides of the breast cartilage portion 20 is removed by a pair of scrapers 111, 112 of the scraper apparatus 100, as described below.

After the yagen remaining meat removal process, the yagen separation process of separating the breast cartilage portion 20 from the workpiece w is performed to separate the breast cartilage portion 20 from the workpiece w.

(Scraper Apparatus 100)

Next, the scraper apparatus 100 according to an embodiment will be described.

Figure 3:
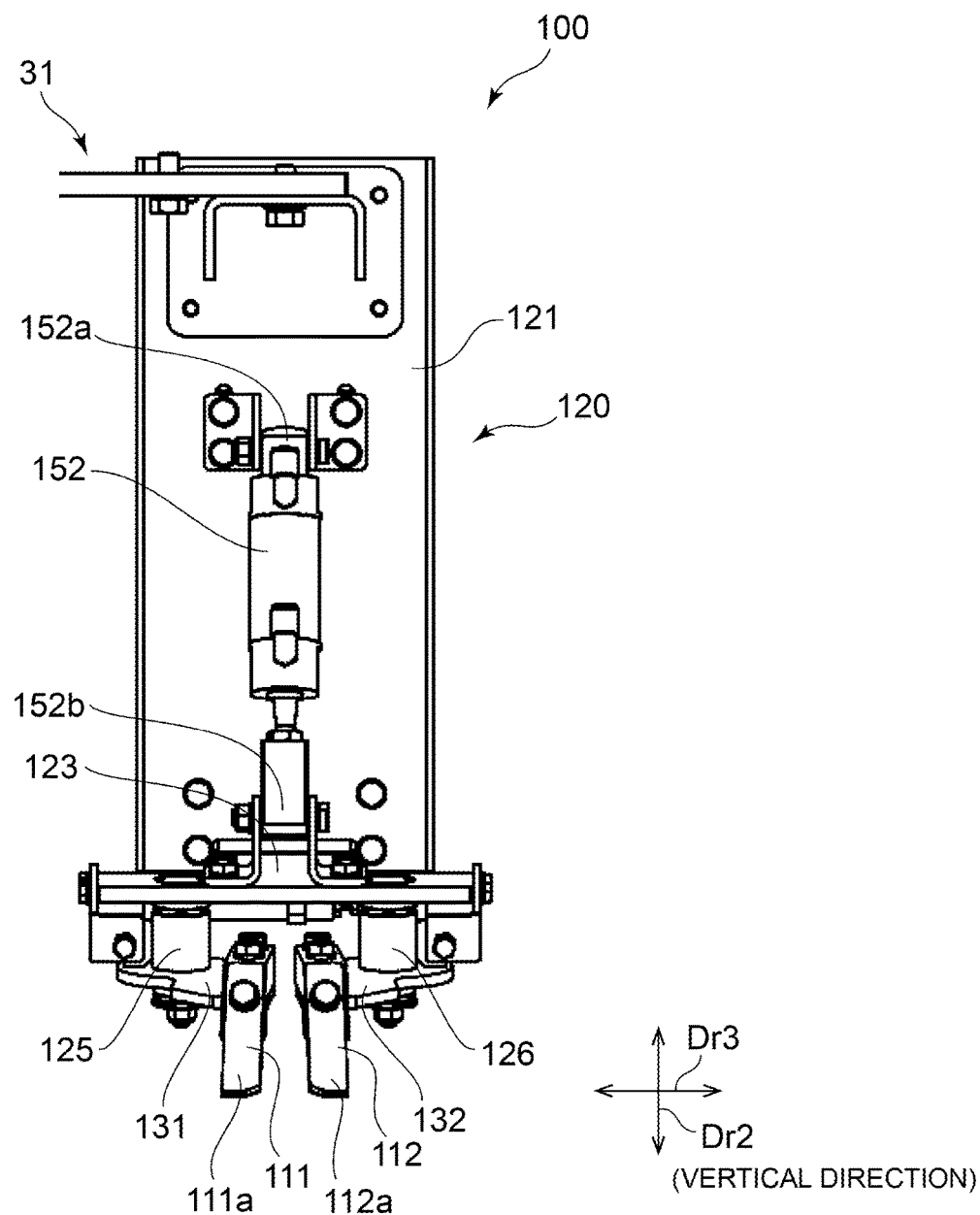
FIG. 3 is a view of the scraper apparatus in the retracted position shown in FIG. 1, viewed from downstream in the conveying direction of the chain conveyor (direction of arrow a).

FIG. 3 is a view of the scraper apparatus 100 in the retracted position shown in FIG. 1, viewed from downstream in the conveying direction of the chain conveyor 10 (direction of arrow a), where the pair of scrapers 111, 112 is open.

Figure 4:
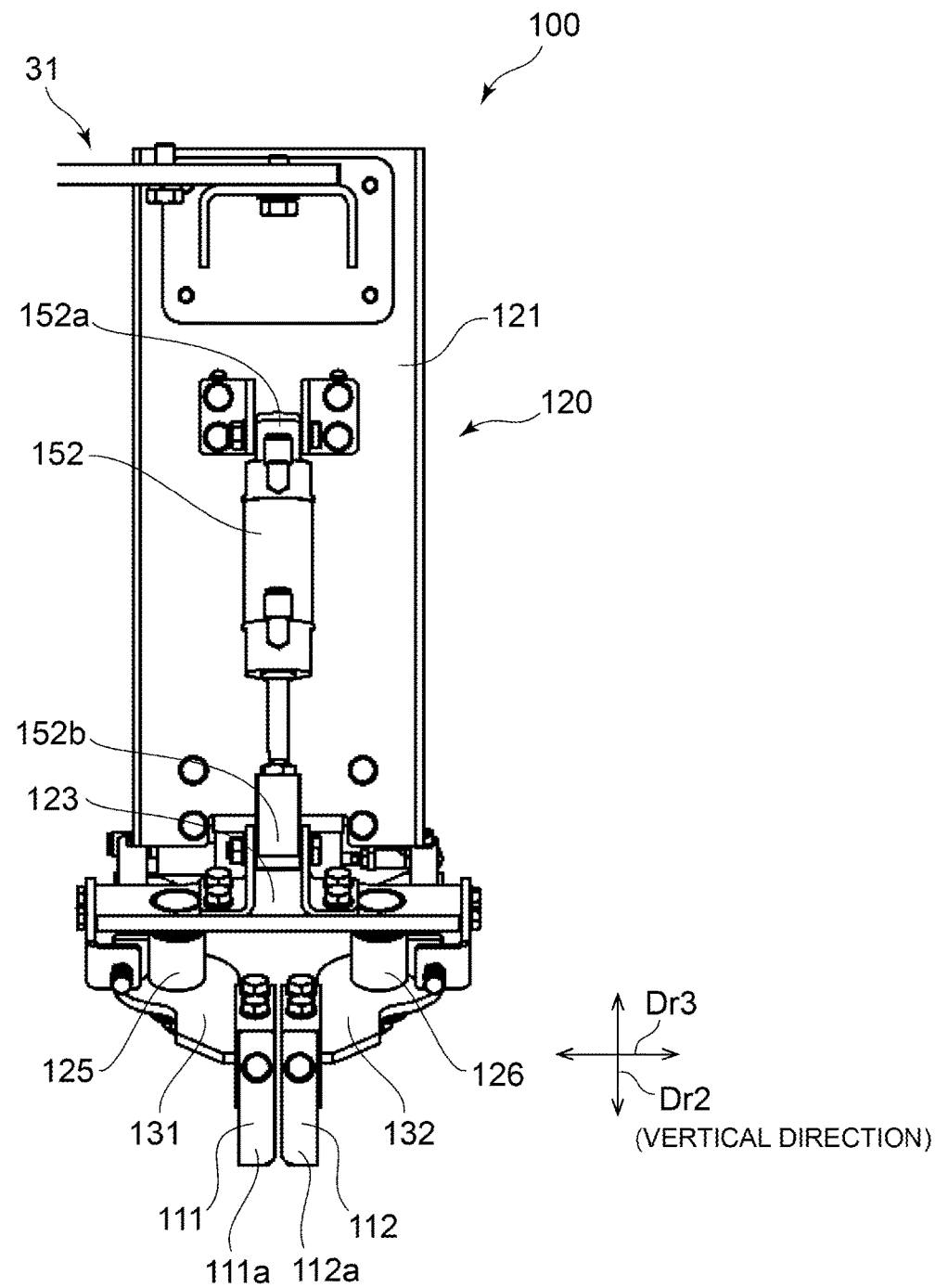
FIG. 4 is a view of the scraper apparatus in the removal position shown in FIG. 2, viewed from downstream in the conveying direction of the chain conveyor (direction of arrow a).

FIG. 4 is a view of the scraper apparatus 100 in the removal position shown in FIG. 2, viewed from downstream in the conveying direction of the chain conveyor 10 (direction of arrow a), where the pair of scrapers 111, 112 is closed.

Figure 5:
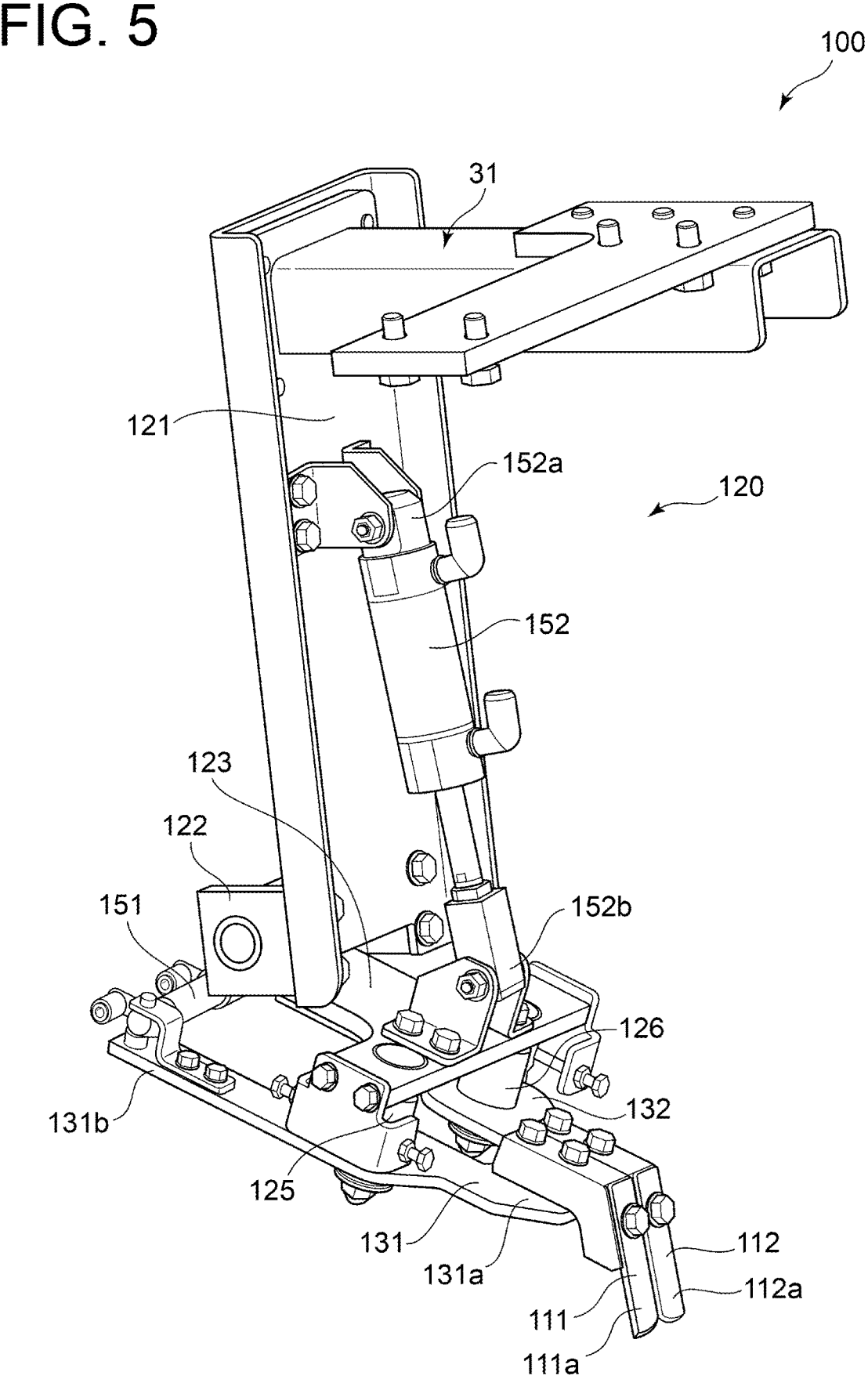
FIG. 5 is a perspective view of the scraper apparatus in the removal position shown in FIG. 2.

FIG. 5 is a perspective view of the scraper apparatus 100 in the removal position shown in FIG. 2, where the pair of scrapers 111, 112 is closed.

Figure 6A:
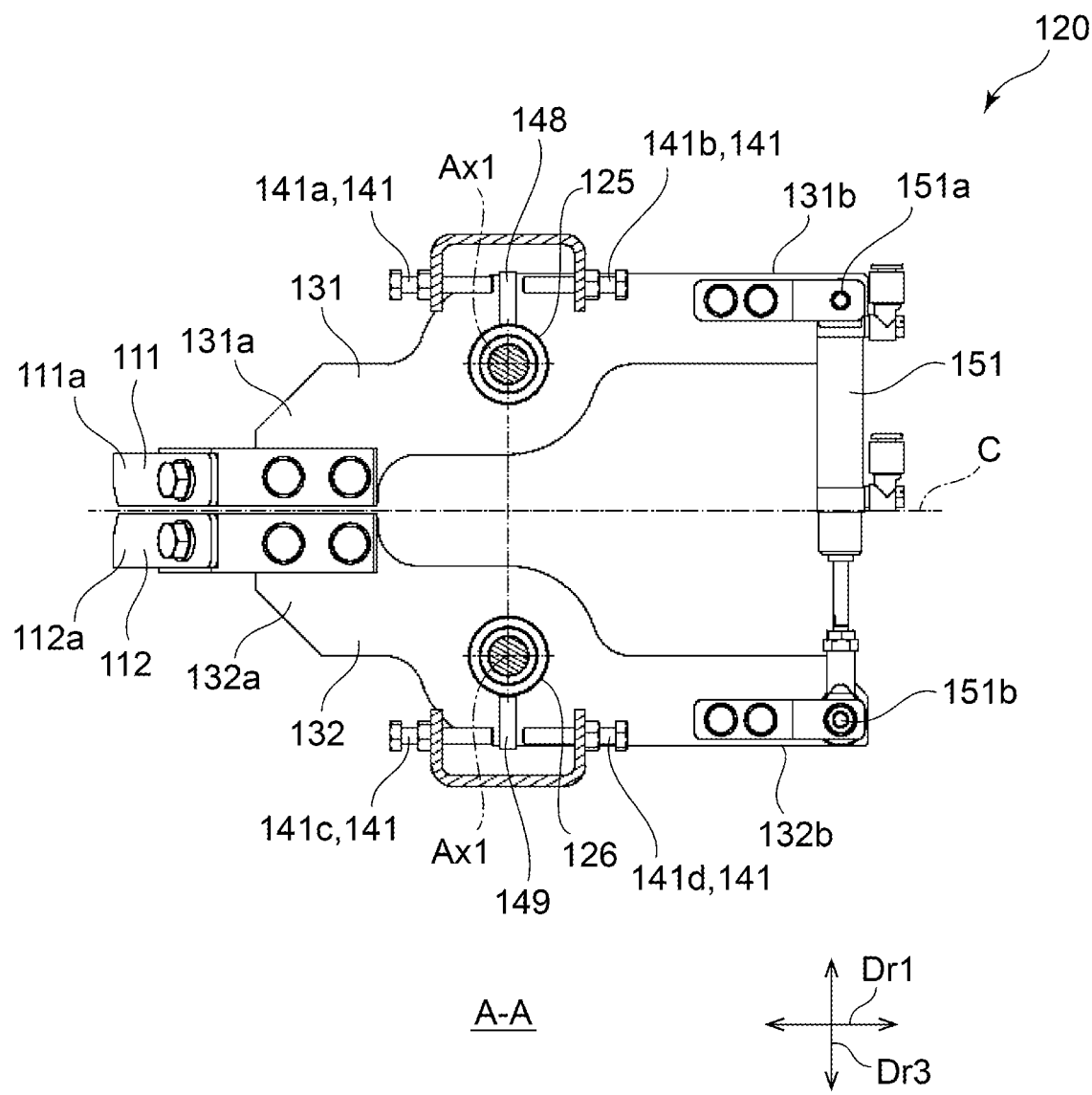
FIG. 6A is a view A-A of FIG. 2, showing the case where the pair of scrapers is not displaced in the third direction.

FIG. 6A is a view A-A of FIG. 2, showing the case where the pair of scrapers 111, 112 is not displaced in the third direction Dr3, which will be described later.

Figure 6B:
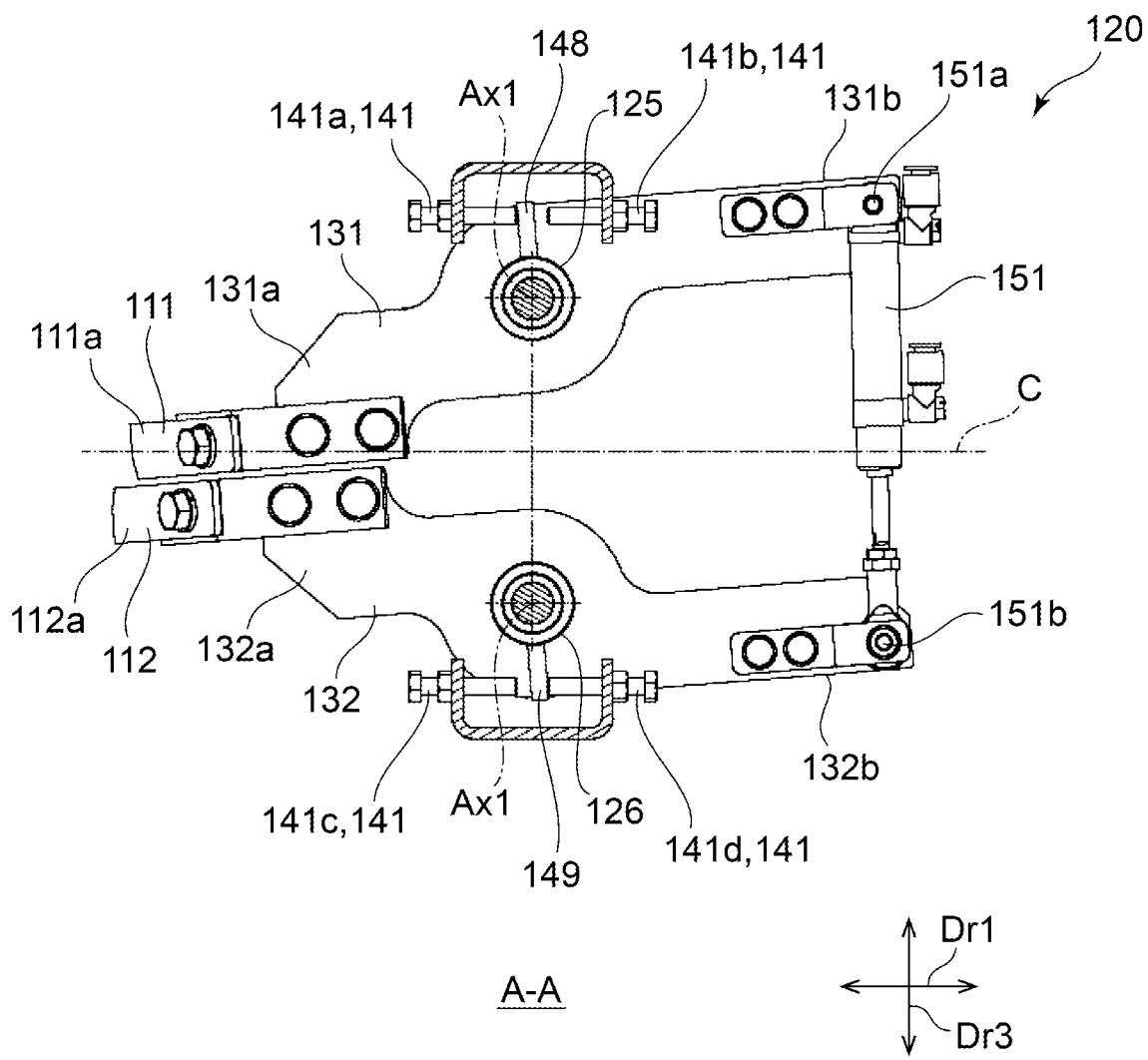
FIG. 6B is a view A-A of FIG. 2, showing an example of the case where the pair of scrapers is displaced in the third direction.

FIG. 6B is a view A-A of FIG. 2, showing an example of the case where the pair of scrapers 111, 112 is displaced in the third direction Dr3, which will be described later.

Figure 6C:
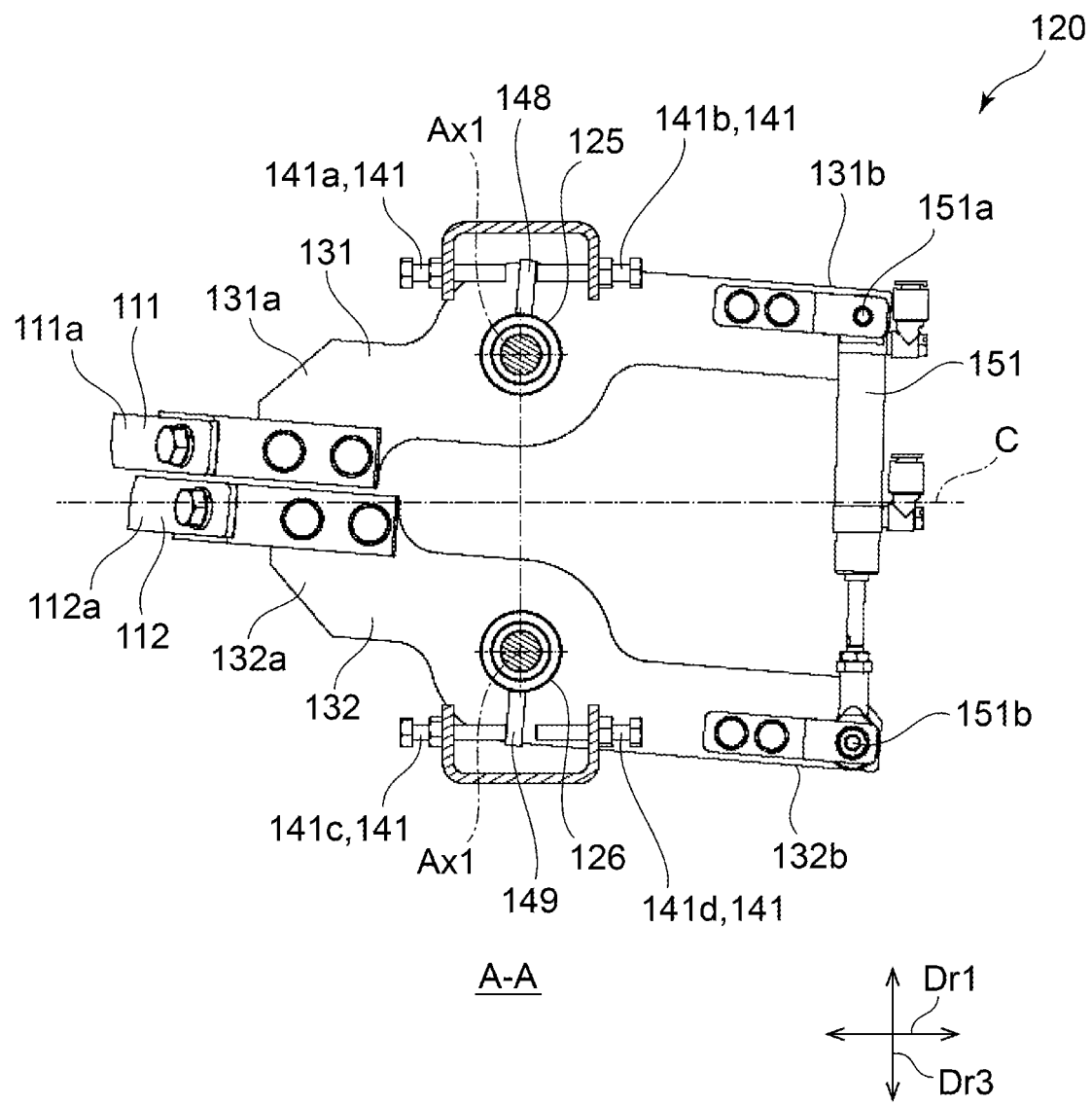
FIG. 6C is a view A-A of FIG. 2, showing another example of the case where the pair of scrapers is displaced in the third direction.

FIG. 6C is a view A-A of FIG. 2, showing another example of the case where the pair of scrapers 111, 112 is displaced in the third direction Dr3, which will be described later.

Figure 7:
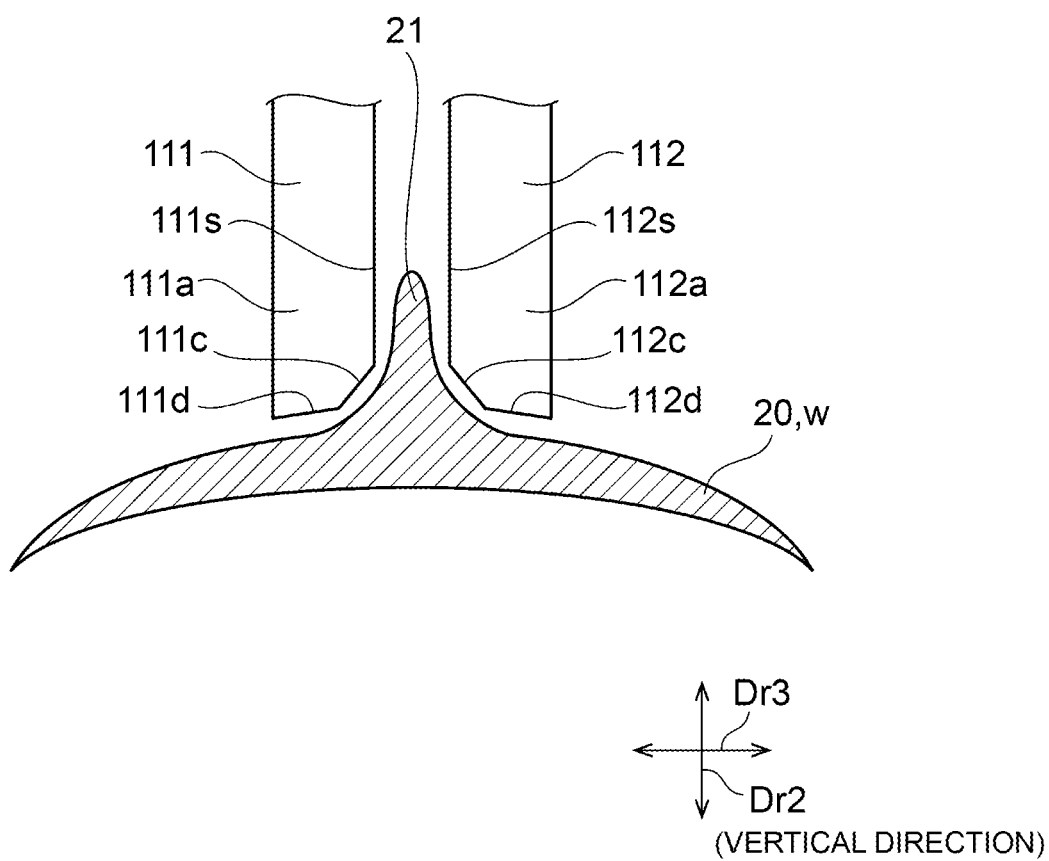
FIG. 7 is a view of the pair of scrapers and the breast cartilage portion, viewed from downstream in the conveying direction of the chain conveyor (direction of arrow a).

FIG. 7 is a view of the pair of scrapers 111, 112 and the breast cartilage portion 20, viewed from downstream in the conveying direction of the chain conveyor 10 (direction of arrow a). For the sake of illustration, FIG. 7 depicts the pair of scrapers 111, 112 and the breast cartilage portion 20 with a slight separation therebetween.

The scraper apparatus 100 according to an embodiment has a pair of scrapers 111, 112, a support part 120 which supports the pair of scrapers, a first drive part 151, and a second drive part 152.

For the sake of illustration, directions in each figure are defined as follows. The conveying direction of the chain conveyor 10 (direction of arrow a) is defined as the first direction Dr1. The first direction Dr1 is also simply referred to as the conveying direction.

The direction in which the cone 12 and the scraper apparatus 100 are spaced apart from each other when viewed from the first direction Dr1 and which is perpendicular to the first direction Dr1 is defined as the second direction Dr2.

The direction perpendicular to each of the first direction Dr1 and the second direction Dr2 is defined as the third direction Dr3.

In the present embodiment, the second direction Dr2 coincides with the vertical direction, and the first direction Dr1 and the third direction Dr3 coincide with the horizontal direction. In FIGS. 1 through 4, the upper side of the paper is the upper side in the vertical direction, and the lower side of the paper is the lower side in the vertical direction. The second direction Dr2 is also simply referred to as the vertical direction.

(Support Part 120)

The support part 120 has a fixed substrate 121, an oscillating substrate 123, and a pair of arm parts 131, 132.

(Fixed Substrate 121)

The fixed substrate 121 is a plate-like member, for example, extending in the second direction Dr2, with an upper portion fixed to a frame (not shown) to which the conveyance device 1 is attached via a bracket 31.

A lower portion of the fixed substrate 121 is provided with an oscillating shaft part 122. The oscillating shaft part 122 is a shaft part that extends in the third direction Dr3 and enables the oscillating substrate 123 to oscillate around the oscillation center axis AX2.

(Oscillating Substrate 123)

The oscillating substrate 123 is a plate-like member, for example, pivotably supported by the oscillating shaft part 122 of the fixed substrate 121, and has a pair of shaft parts 125, 126 which pivotably support the pair of arm parts 131 and 132 around the respective rotation center axes AX1, as described below.

The oscillating substrate 123 is configured to oscillate around the oscillation center axis AX2 by the second drive part 152. The second drive part 152 is an actuator, such as an air cylinder, with a base end portion 152a of the cylinder attached to the fixed substrate 121 and a tip end portion 152*b* of the rod attached to the oscillating substrate 123. As the rod of the second drive part 152 extends and retracts, the oscillating substrate 123 oscillates around the oscillation center axis AX2.

(Pair of Arm Parts 131, 132)

The pair of arm parts 131, 132 includes one arm part 131 and the other arm part 132. Each of the pair of arm parts 131, 132 extends primarily in the first direction Dr1.

One arm part 131 has a tip end 131*a*, i.e., a downstream end portion in the first direction Dr1, to which one scraper 111 of the pair of scrapers 111, 112, described below, is attached. One arm part 131 has a base end 131*b*, i.e., an upstream end portion in the first direction Dr1, to which the first drive part 151, described below, is attached.

The other arm part 132 has a tip end 132*a*, i.e., a downstream end portion in the first direction Dr1, to which the other scraper 112 of the pair of scrapers 111, 112, described below, is attached. The other arm part 132 has a base end 132*b*, i.e., an upstream end portion in the first direction Dr1, to which the first drive part 151, described below, is attached.

One arm part 131 is pivotably supported around the rotation center axis AX1 by one shaft part 125 of the pair of shaft parts 125, 126 at a position between the tip end 131*a* and the base end 131*b*.

The other arm part 132 is pivotably supported around the rotation center axis AX1 by the other shaft part 126 of the pair of shaft parts 125, 126 at a position between the tip end 132*a* and the base end 132*b*.

The pair of arm parts 131, 132 is configured to rotate around the respective rotation center axes AX1 by the first drive part 151. The first drive part 151 is an actuator, such as an air cylinder, with a base end portion 151*a* of the cylinder attached to the base end 131*b* of one arm part 131 and a tip end portion 151*b* of the rod attached to the base end 132*b* of the other arm part 132, for example. As the rod of the first drive part 151 extends and retracts, the pair of arm parts 131, 132 rotates around the respective rotation center axes AX1.

The first drive part 151 is pin-jointed to the base end 131*b* of one arm part 131 and the base end 132*b* of the other arm part 132.

In the scraper apparatus 100 according to an embodiment, the first drive part 151 is constrained only to the base end 131*b* of one arm part 131 and the base end 132*b* of the other arm part 132.

When the rod of the first drive part 151 is extended, one scraper 111 attached to the tip end 131*a* of one arm part 131 and the other scraper 112 attached to the tip end 132*a* of the other arm part 132 move closer together along the third direction Dr3.

When the rod of the first drive part 151 is retracted, one scraper 111 attached to the tip end 131*a* of one arm part 131 and the other scraper 112 attached to the tip end 132*a* of the other arm part 132 move apart from each other along the third direction Dr3.

That is, the first drive part 151 is a drive unit for moving the pair of scrapers 111, 112 in the third direction Dr3 so as to pinch the breast cartilage portion 20 between the pair of scrapers 111, 112, as described below.

This allows the breast cartilage portion 20 to be put between the pair of scrapers 111, 112 to efficiently remove meat attached to the breast cartilage portion 20, as described below.

In the scraper apparatus 100 according to an embodiment, the support part 120 (oscillating substrate 123) has a pair of shaft parts 125, 126. Further, the first drive part 151 is configured to change the distance between the base end 131*b* of one arm part 131 and the base end 132*b* of the other arm part 132.

This allows the pair of scrapers 111, 112 to be moved in the third direction Dr3 with a relatively simple configuration to pinch the breast cartilage portion 20, as described below.

(Pair of Scrapers 111, 112)

Each of the pair of scrapers 111, 112 is a plate-like member extending primarily in the second direction Dr2. The pair of scrapers 111, 112 includes one scraper 111 and the other scraper 112.

The pair of scrapers 111, 112 is attached to the tip ends 131*a*, 132*a* of the pair of arm parts 131, 132 so that their tip end portions 111*a*, 112*a* protrude downward from the tip ends 131*a*, 132*a* of the pair of arm parts 131, 132, respectively.

As well shown in FIG. 7, one scraper 111 has a tip surface 111*d* facing downward, a side surface 111*s* facing the other scraper 112, and a chamfered connection portion 111*c* between the tip surface 111*d* and the side surface 111*s*.

The other scraper 112 has a tip surface 112*d* facing downward, a side surface 112*s* facing one scraper 111, and a chamfered connection portion 112*c* between the tip surface 112*d* and the side surface 112*s*.

The connection portions 111*c*, 112*c* are square chamfered in the example shown in FIG. 7, but may be round chamfered.

The thickness of the pair of scrapers 111 and 112 may be thinner in the region in the vicinity of the tip surfaces 111*d*, 112*d* and the tip surfaces of the connection portions 111*c*, 112*c* than in the region far from the tip surfaces 111*d*, 112*d* and the connection portions 111*c*, 112*c* in order to increase the surface pressure when contacting the breast cartilage portion 20.

Additionally, the thickness may be thinner in the region of the side surfaces 111*s*, 112*s* in contact with the breast cartilage portion 20 than in the region far from that region.

(Removal of Meat Remaining on Both Sides of Breast Cartilage Portion 20)

The scraper apparatus 100 according to an embodiment with such configuration removes meat remaining on both sides of the breast cartilage portion 20 in the following manner.

The scraper apparatus 100 according to an embodiment has a control device (not shown) that enables the following operations of each part.

First, as shown in FIG. 1, the scraper apparatus 100 waits in the retracted position until the workpiece w is conveyed to a predetermined position. In the scraper apparatus 100 according to an embodiment, by retracting the rod of the second drive part 152, the oscillating substrate 123, the pair of arm parts 131, 132, and the pair of scrapers 111, 112 rotate clockwise in FIGS. 1 and 2 around the oscillation center axis AX2, so that the scraper apparatus 100 moves to the retracted position.

In the retracted position, the rod of the first drive part 151 is retracted, and the pair of scrapers 111, 112 is open, as shown in FIG. 3.

When the workpiece w reaches the predetermined position, the scraper apparatus 100 moves to the removal position and removes the remaining meat from the surfaces on both sides of the sternal ridge cartilage site 20. More specifically, when the workpiece w reaches the predetermined position, by extending the rod of the second drive part 152, the oscillating substrate 123, the pair of arm parts 131, 132, and the pair of scrapers 111, 112 rotate counterclockwise in FIGS. 1 and 2 around the oscillation center axis AX2, so that the scraper apparatus 100 moves to the removal position. As a result, the tip end portions 111a, 112a of the pair of scrapers 111, 112 come into contact with the top surface of the workpiece w. At this time, the rod of the first drive part 151 is retracted, and the pair of scrapers 111, 112 is open, as shown in FIG. 3.

Thus, in the scraper apparatus 100 according to an embodiment, the second drive part 152 is a drive unit for moving the pair of scrapers 111, 112 to come closer to the cone 12.

This allows the pair of scrapers 111, 112 to move to a proper position relative to the breast cartilage portion 20, so that meat attached to the breast cartilage portion 20 can be efficiently removed.

After moving to the removal position, the scraper apparatus 100 extends the rod of the first drive part 151 to close the pair of scrapers 111, 112, as shown in FIGS. 4 and 7. As a result, the side of the breast cartilage portion 20 is pinched between the side surface 111s of one scraper 111 and the side surface 112s of the other scraper 112.

As the workpiece w moves downstream in the conveying direction in this state, meat remaining on both sides of the breast cartilage portion 20 is removed by the tip surfaces 111d, 112d, the connection portions 111c, 112c, and the side surfaces 111s, 112s of the pair of scrapers 111, 112.

In the scraper apparatus 100 according to an embodiment, one scraper 111 has a chamfered connection portion 111c between the tip surface 111d and the side surface 111s, and the other scraper 112 has a chamfered connection portion 112c between the tip surface 112d and the side surface 112s.

By chamfering the connection portions 111c, 112c to match the shape of the breast cartilage portion 20, the breast cartilage portion 20 is prevented from being damaged by the connection portions 111c, 112c, and meat can be removed efficiently.

After removing the remaining meat, the scraper apparatus 100 retreats to the retracted position and waits until the next workpiece w reaches the predetermined position, and when the next workpiece w reaches the predetermined position, the above-described operation is performed again.

(Allowing Displacement of Pair of Scrapers 111, 112 in Third Direction Dr3)

The scraper apparatus 100 according to an embodiment is configured to allow the displacement of the pair of scrapers 111, 112 in the third direction Dr3 to follow the shape of the breast cartilage portion 20 when the side of the breast cartilage portion 20 is between the pair of scrapers 111, 112.

As described above, in the scraper apparatus 100 according to an embodiment, the pair of arm parts 131, 132 is pivotably supported around the rotation center axes AX1 by the pair of shaft parts 125, 156 at positions between the tip ends 131a, 132a and the base ends 131b, 132b, respectively. Accordingly, when the rod of the first drive part 151 is extended, the pair of scrapers 111, 112 moves along the third direction Dr3 so as to be closed, as shown in FIG. 4 and FIGS. 6A to 6C.

At this time, if the pair of scrapers 111, 112 is closed without, for example, the breast cartilage portion 20 therebetween, as shown in FIG. 6A, the pair of scrapers 111, 112 face each other on opposite sides of the center line C passing through the center of the cone 12 along the conveyance path of the cone 12 formed by the chain conveyor 10, when viewed from the second direction Dr2.

As described above, in the scraper apparatus 100 according to an embodiment, the first drive part 151 is constrained only by the base end 131b of one arm part 131 and the base end 132b of the other arm part 132. In other words, in the scraper apparatus 100 according to an embodiment, the first drive part 151 is not constrained by any structure other than the pair of arm parts 131, 132, so it can move freely with the pair of arm parts 131, 132.

Therefore, as shown in FIGS. 6B and 6C, as the pair of arm parts 131, 132 rotates around the rotation center axes AX1, the pair of scrapers 111, 112 can be displaced from the center line C along the third direction Dr3.

As a result, even if a portion 21 of the breast cartilage portion 20 protruding to the outer side of the workpiece w, i.e., toward the second direction Dr2, is deformed and displaced from the center line C when viewed from the second direction Dr2, the pair of scrapers 111, 112 is allowed to be displaced in the third direction Dr3 to follow the shape of the breast cartilage portion 20.

When the pair of scrapers 111, 112 is displaced from the center line C along the third direction Dr3, the first drive part 151, which is located on the opposite side of the pair of shaft parts 125, 126 from the pair of scrapers 111, 112, also moves along the third direction Dr3. As described above, in the scraper apparatus 100 according to an embodiment, the first drive part 151 is not constrained by any structure other than the pair of arm parts 131, 132, so it can move freely with the pair of arm parts 131, 132. Therefore, the first drive part 151 does not prevent the pair of scrapers 111, 112 from being displaced in the third direction Dr3.

The scraper apparatus 100 according to an embodiment is equipped with a restricting member 141 for restricting the range of rotation of the pair of arm parts 131, 132 that rotate around the pair of shaft parts 125, 126, respectively.

Specifically, the restricting member 141 includes four restricting bolts 141a, 141b, 141c, and 141d for restricting the range of rotation of protrusions 148, 149, which will be described below. The four restricting bolts 141a, 141b, 141c, and 141d are fixed to the oscillating substrate 123.

One arm part 131 has one protrusion 148 extending radially outward about the rotation center axis AX1 of one shaft part 125 and fixed to one arm part 131.

The other arm part 132 has the other protrusion 149 extending radially outward about the rotation center axis AX1 of the other shaft part 126 and fixed to the other arm part 132.

When one arm part 131 rotates around the rotation center axis AX1 of one shaft part 125, one protrusion 148 also rotates around the rotation center axis AX1.

The range of rotation of one protrusion 148 is restricted by two restricting bolts 141a and 141b, while the range of rotation of the other protrusion 149 is restricted by the other two restricting bolts 141c and 141d.

The restricting bolt 141a, which is located downstream of one protrusion 148 in the conveying direction (first direction Dr1), restricts the rotation of one arm part 131 in the counterclockwise direction in the figure as the bolt tip abuts against one protrusion 148 from downstream in the conveying direction (first direction Dr1), as shown in FIG. 6B.

The restricting bolt 141b, which is located upstream of one protrusion 148 in the conveying direction (first direction Dr1), restricts the rotation of one arm part 131 in the clockwise direction in the figure as the bolt tip abuts against one protrusion 148 from upstream in the conveying direction (first direction Dr1), as shown in FIG. 6C.

The restricting bolt 141c, which is located downstream of the other protrusion 149 in the conveying direction (first direction Dr1), restricts the rotation of the other arm part 132 in the clockwise direction in the figure as the bolt tip abuts against the other protrusion 149 from downstream in the conveying direction (first direction Dr1), as shown in FIG. 6C.

The restriction bolt 141*d*, which is located upstream of the other protrusion 149 in the conveying direction (first direction Dr1), restricts the rotation of the other arm part 132 in the counterclockwise direction in the figure as the bolt tip abuts against the other protrusion 149 from upstream in the conveying direction (first direction Dr1), as shown in FIG. 6B.

Thus, the scraper apparatus 100 according to an embodiment can restrict the range of movement of the pair of scrapers 111, 112 in the third direction Dr3.

As described above, the scraper apparatus 100 according to an embodiment includes a pair of scrapers 111, 112 disposed opposite each other in the third direction Dr3 and configured to remove meat attached to the breast cartilage portion 20, which is a processed portion of the workpiece w, by putting the breast cartilage portion 20 between the pair of scrapers 111, 112. The scraper apparatus 100 according to an embodiment includes a support part 120 which supports the pair of scrapers 111, 112 so as to allow displacement of the pair of scrapers 111, 112 in the third direction Dr3 to follow the shape of the breast cartilage portion 20 of the workpiece w moving in the conveying direction (direction of arrow a).

Thus, meat attached to the breast cartilage portion 20 can be efficiently removed while suppressing damage to the breast cartilage portion 20.

The present disclosure is not limited to the embodiments described above, but includes modifications to the embodiments described above, and embodiments composed of combinations of those embodiments.

For example, the scraper apparatus 100 according to the above-described embodiment is configured to remove meat remaining on the breast cartilage portion 20, but it may be configured to remove meat remaining on a portion other than the breast cartilage portion 20. Additionally, the scraper apparatus 100 according to the above-described embodiment is configured to remove meat remaining in the poultry carcass, but it may be configured to remove meat remaining in a livestock carcass other than the poultry carcass.

The contents described in the above embodiments would be understood as follows, for instance.

(1) A scraper apparatus 100 according to at least one embodiment of the present disclosure includes a pair of scrapers 111, 112 disposed opposite each other in a direction perpendicular to a conveying direction of a poultry carcass (workpiece w) held by a holder (cone 12) and configured to remove meat attached to a processed portion (breast cartilage portion 20) of the poultry carcass (workpiece w) by putting the processed portion (breast cartilage portion 20) between the pair of scrapers 111, 112. The scraper apparatus 100 according to at least one embodiment of the present disclosure includes a support part 120 which supports the pair of scrapers 111, 112 so as to allow displacement of the pair of scrapers 111, 112 in the perpendicular direction (third direction Dr3) to follow the shape of the processed portion (breast cartilage portion 20) of the poultry carcass (workpiece w) moving in the conveying direction.

With the above configuration (1), since the pair of scrapers 111, 112 moves in accordance with the shape of the processed portion (breast cartilage portion 20) of the poultry carcass (workpiece w), meat attached to the processed portion (breast cartilage portion 20) can be efficiently removed while suppressing damage to the processed portion (breast cartilage portion 20).

(2) In some embodiments, in the above configuration (1), the apparatus may include a first drive part 151 for moving the pair of scrapers 111, 112 in the perpendicular direction (third direction Dr3) so as to put the processed portion (breast cartilage portion 20) between the pair of scrapers 111, 112.

With the above configuration (2), meat attached to the processed portion (breast cartilage portion 20) can be efficiently removed by putting the processed portion (breast cartilage portion 20) between the pair of scrapers 111, 112.

(3) In some embodiments, in the above configuration (2), the support part 120 includes a pair of arm parts 131, 132 including one arm part 131 with a tip end to which one scraper 111 of the pair of scrapers 111, 112 is attached and another arm part 132 with a tip end to which the other scraper 112 of the pair of scrapers 111, 112 is attached. The support part 120 includes a pair of shaft parts 125, 126 pivotally supporting the pair of arm parts 131, 132, respectively, so that the pair of scrapers 111, 112 moves in the perpendicular direction (third direction Dr3). The first drive part 151 may be configured to change a distance between a base end 131*b* of one arm part 131 and a base end 132*b* of the other arm part 132.

With the above configuration (3), the pair of scrapers 111, 112 can be moved in the perpendicular direction (third direction Dr3) with a relatively simple configuration to pinch the processed portion (breast cartilage portion 20) of the poultry carcass (workpiece w).

(4) In some embodiments, in the above configuration (3), the apparatus may include a restricting member 141 for restricting the range of rotation of the pair of arm parts 131, 132 that rotate around the pair of shaft parts 125, 126, respectively.

With the above configuration (4), it is possible to restrict the range of movement of the pair of scrapers 111, 1112 in the perpendicular direction (third direction Dr3).

(5) In some embodiments, in the above configuration (3) or (4), the first drive part 151 may be constrained only to the base end 131*b* of one arm part 131 and the base end 132*b* of the other arm part 132.

With the above configuration (5), since the first drive part 151 is not constrained by any structure other than the pair of arm parts 131, 132, it can move freely with the pair of arm parts 131, 132. Therefore, the first drive part does not prevent the pair of scrapers 111, 112 from being displaced in the perpendicular direction (third direction Dr3).

(6) In some embodiments, in any one of the above configurations (1) to (5), the apparatus may include a second drive part 152 for moving the pair of scrapers 111, 112 to come closer to the holder (cone 12).

With the above configuration (6), since the pair of scrapers 111, 112 can move to a proper position relative to the processed portion (breast cartilage portion 20), meat attached to the processed portion (breast cartilage portion 20) can be efficiently removed.

(7) In some embodiments, in any one of the above configurations (1) to (6), one scraper 111 of the pair of scrapers 111, 112 may be chamfered at a connection portion 111*c* between a tip surface 11*d* of the one scraper 111 and a side surface 111*s* facing the other scraper 112 of the pair of scrapers 111, 112, and the other scraper may be chamfered at a connection portion 112*c* between a tip surface 112*d* of the other scraper 112 and a side surface 112*s* facing the one scraper 111.

With the above configuration (7), by chamfering the connection portions 111*c*, 112*c* to match the shape of the processed portion (breast cartilage portion 20), the processed portion (breast cartilage portion 20) is prevented from being damaged by the connection portions 111c, 112c, and meat can be removed efficiently.

(8) In some embodiments, in any one of the above configurations (1) to (7), the processed portion may be a breast cartilage portion 20.

With the above configuration (8), meat attached to the breast cartilage portion 20 can be efficiently removed while suppressing damage to the breast cartilage portion 20.

REFERENCE SIGNS LIST

1 Conveyance device
12 Cone (Holder)
20 Breast cartilage portion (Processed portion)
100 Scraper apparatus
111 Scraper (One scraper)
111c Connection portion
112 Scraper (Other scraper)
112c Connection portion
120 Support part
125 Shaft part (One shaft part)
126 Shaft part (Other shaft part)
131 Arm part (One arm part)
132 Arm part (Other arm part)
141 Restricting member
151 First drive part
152 Second drive part

The invention claimed is:

1. A scraper apparatus, comprising:
a pair of scrapers disposed opposite each other in a perpendicular direction to a conveying direction of a poultry carcass held by a holder and configured to remove meat attached to a processed portion of the poultry carcass by putting the processed portion between the pair of scrapers; and
a support part which supports the pair of scrapers so as to allow displacement of the pair of scrapers in the perpendicular direction to follow a shape of the processed portion of the poultry carcass moving in the conveying direction,
wherein in a case where the processed portion of the poultry carcass is not disposed between the pair the scrapers, the pair of scrapers face each other while being on opposite sides of a center line extending in the conveyance direction, and in a case where the processed portion of the poultry carcass is disposed between the pair the scrapers, the support part allows displacement of the pair of scrapers in the perpendicular direction such that one scraper of the pair of scrapers is configured to cross the center line extending in the conveyance direction.

2. The scraper apparatus according to claim 1, further comprising a first drive part for moving the pair of scrapers in the perpendicular direction so as to put the processed portion between the pair of scrapers.

3. The scraper apparatus according to claim 2, wherein the support part includes:
a pair of arm parts including one arm part with a tip end to which one of the pair of scrapers is attached and another arm part with a tip end to which the other of the pair of scrapers is attached; and
a pair of shaft parts pivotally supporting the pair of arm parts, respectively, so that the pair of scrapers moves in the perpendicular direction, and
wherein the first drive part is configured to change a distance between a base end of one arm part and a base end of the other arm part.

4. The scraper apparatus according to claim 3, wherein the support part has a restricting member for restricting a range of rotation of the pair of arm parts that rotate around the pair of shaft parts, respectively.

5. The scraper apparatus according to claim 3, wherein the first drive part is constrained only to the base end of one arm part and the base end of the other arm part.

6. The scraper apparatus according to claim 1, further comprising a second drive part for moving the pair of scrapers to come closer to the holder.

7. The scraper apparatus according to claim 1, wherein one scraper of the pair of scrapers is chamfered at a connection portion between a tip surface of the one scraper and a side surface facing the other scraper of the pair of scrapers, and
wherein the other scraper is chamfered at a connection portion between a tip surface of the other scraper and a side surface facing the one scraper.

8. The scraper apparatus according to claim 1, wherein the processed portion is a breast cartilage portion.

9. A scraper apparatus, comprising:
a pair of scrapers disposed opposite each other in a perpendicular direction to a conveying direction of a poultry carcass held by a holder and configured to remove meat attached to a processed portion of the poultry carcass by putting the processed portion between the pair of scrapers;
a support part which supports the pair of scrapers so as to allow displacement of the pair of scrapers in the perpendicular direction to follow a shape of the processed portion of the poultry carcass moving in the conveying direction; and
a first drive part for moving the pair of scrapers in the perpendicular direction so as to put the processed portion between the pair of scrapers.

10. A scraper apparatus, comprising:
a pair of scrapers disposed opposite each other in a perpendicular direction to a conveying direction of a poultry carcass held by a holder and configured to remove meat attached to a processed portion of the poultry carcass by putting the processed portion between the pair of scrapers;
a support part which supports the pair of scrapers so as to allow displacement of the pair of scrapers in the perpendicular direction to follow a shape of the processed portion of the poultry carcass moving in the conveying direction; and
a second drive part for moving the pair of scrapers to come closer to the holder.

* * * * *